Nov. 21, 1967     B. C. BENJAMIN     3,353,580

NUT AND BOLT CONSTRUCTION

Filed May 12, 1966

INVENTOR.

BENJAMIN C. BENJAMIN

BY

Barnes, Kisselle, Raisch & Choate

ATTORNEYS

United States Patent Office 3,353,580
Patented Nov. 21, 1967

3,353,580
NUT AND BOLT CONSTRUCTION
Benjamin C. Benjamin, Flint, Mich., assignor to F & E
Manufacturing Company, Wyandotte, Mich., a corporation of Michigan
Filed May 12, 1966, Ser. No. 549,627
10 Claims. (Cl. 151—7)

ABSTRACT OF THE DISCLOSURE

The nut and bolt construction disclosed herein comprises a nut body which is formed with a circular threaded opening. The nut body is formed with a cylindrical cavity in which a generally cylindrical insert of low friction material such as nylon is inserted. The diameter of the cavity is slightly greater than the outer diameter of the insert and an axial flange on the body engages the end surface of the insert and frictionally yet rotatably holds it in position in the cavity. The insert is formed with a non-circular opening and has a diameter substantially equal to the pitch time of the thread. The bolt which is associated with the nut is also formed with a non-circular cross section and a thread which engages the thread of the nut body.

---

This invention relates to a nut and bolt construction.

Among the objects of the invention are to provide an efficient nut and bolt construction wherein the bolt and nut can be readily threaded together; which will not shake apart during normal operation and wherein the nut can be readily unthreaded relative the bolt when desired.

Figure 1:
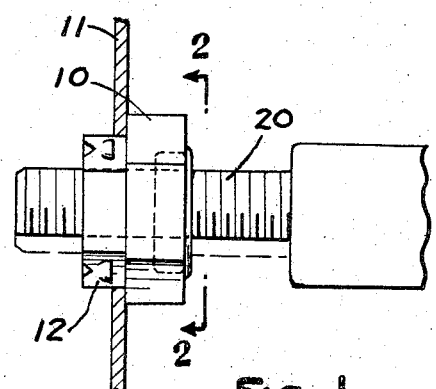
FIG. 1 is a part sectional view through a nut and bolt construction embodying the invention.
Figure 2:
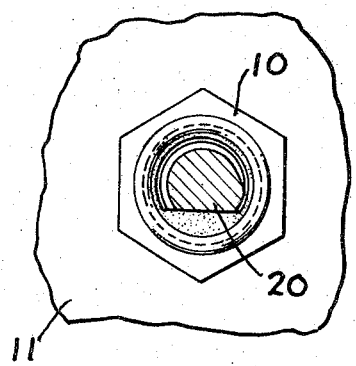
FIG. 2 is a fragmentary sectional view taken along the line 2—2 in FIG. 1.

Referring to FIG. 1, the nut and bolt construction embodying the invention is shown in connection with a clinch nut arrangement wherein the nut body 10 is clinched on a piece of sheet metal 11 in any well-known manner such as by deforming a portion 12 of the body.

Figure 3:
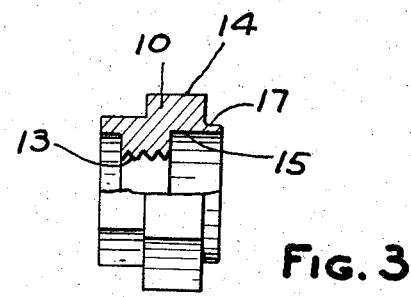
FIG. 3 is a part sectional view through the nut body.
Figure 4:
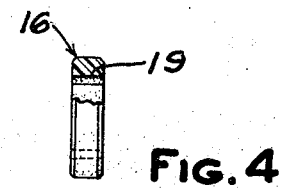
FIG. 4 is a side view through an insert utilized in the nut body.
Figure 6:
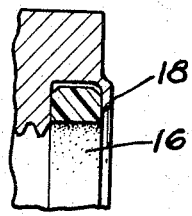
FIG. 6 is a fragmentary sectional view through the nut embodying the invention.
Figure 5:
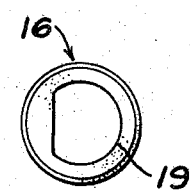
FIG. 5 is a plan view of the insert shown in FIG. 4.

In accordance with the invention, the nut body 10 is formed with a circular threaded opening 13. The outer surface 14 of the body is formed hexagonally to provide wrench engaging surfaces. The nut body 10 is formed with a cylindrical cavity 15 in which a generally cylindrical insert 16 of low friction material such as nylon is inserted. The diameter of the cavity 15 is slightly greater than the outer diameter of the insert 16. An axial flange 17 (FIG. 3) is turned over as at 18 in FIG. 6 to axially engage the end surface of the insert 16 and frictionally hold it in position in the cavity 15.

The insert 16 is formed with a non-circular opening 19 herein shown as D-shaped wherein the circular portion of the opening has a diameter substantially equal to the pitch diameter of the thread 13.

The bolt or stud 20 which is associated with the nut is also formed with a non-circular cross section, herein shown as D-shaped, and has a thread thereon that is adapted to engage the thread 13.

In use, the bolt 20 is threaded into the nut 10. During the threading movement, the nylon insert 16 rotates relative to the nut body. After the bolt has been threaded to the desired position, any tendency of the nut and bolt to become unthreaded from one anoher is retarded by the frictional engagement between the insert 16 and threads of the bolt 20. However, when it is desired to change the threaded adjustment or remove the bolt from the nut, application of a force greater than the force encountered due to vibration and the like will cause the insert 16 to rotate relative to the nut body 10 and permit the bolt to be changed in its threaded position or be unthreaded from the nut body.

It can thus be seen that there has been provided a relatively simple and inexpensive nut and bolt construction wherein the nut and bolt can be readily assembled but the threaded position of the nut and bolt are effectively prevented from being changed due to the forces such as vibration and the like.

I claim:

1. A nut construction comprising a nut body having a threaded circular opening therethrough,
    and an insert of low friction material having a non-circular opening therein,
    said body and insert having interengaging portions frictionally yet rotatably mounting the insert on the body,
    said non-circular opening having at least one diametral dimension less than the diameter of the circular opening,
    and a bolt having a complementary non-circular configuration with a thread thereon whereby said nut and bolt can be threaded together,
    said insert rotating relative to said body during the threading movement but operable to retard threading by frictional engagement of a portion thereof with a portion of the nut body.

2. The combination set forth in claim 1 wherein said insert is made of nylon.

3. The combination set forth in claim 1 wherein said interengaging portions which form the frictional engagement of said insert with said nut body comprise an inwardly turned flange on the nut engaging an end of the insert and axially restraining said insert.

4. The combination set forth in claim 1 wherein said nut body has a radially inwardly extending cavity in which said insert is positioned, said cavity being generally cylindrical.
    said insert being of substantially the same shape but having a slightly lesser diameter than said cavity,
    said interengaging portions which form the frictional engagement between said body and said insert comprising an integral flange on said body engaging the end of the insert to axially restrain and frictionally retard rotation of the insert relative to the nut body.

5. The combination set forth in claim 1 wherein said non-circular opening is D-shaped.

6. A nut construction comprising a nut body having a threaded circular opening therethrough.
    and an insert of low friction material having a non-circular opening therein,
    said body and insert having interengaging portions frictionally yet rotatably mounting the insert on the body,
    said non-circular opening having at least one diametral dimension less than the diameter of the circular opening,
    said insert rotating relative to said body during the threading movement but operable to retard threading by frictional engagement of a portion thereof with a portion of the nut body.

7. The combination set forth in claim 6 wherein said insert is made of nylon.

8. The combination set forth in claim 6 wherein said interengaging portions which form the frictional engagement of said insert with said nut body comprise an inwardly turned flange on the nut engaging an end of the insert and axially restraining said insert.

9. The combination set forth in claim 6 wherein said nut body has a cylindrical cavity in which said insert is positioned, said cavity beng generally cylindrical,
- said insert beng of substantially the same shape but having a slightly lesser diameter,
- said interengaging portions which form the frictional engagement between said body and said insert comprising an integral flange on said body engaging the end of the insert to axially restrain and frictionally retard rotation of the insert relative to the nut body.

10. The combination set forth in claim 9 wherein said non-circular opening is D-shaped.

References Cited

UNITED STATES PATENTS

| | | | |
|---|---|---|---|
| 1,366,829 | 1/1921 | Pascoe | 151—30 |
| 2,365,380 | 12/1944 | Bloomfield | 151—7 |
| 2,286,667 | 6/1942 | Brooke | 151—7 |
| 2,588,372 | 3/1952 | Erb | 151—7 |
| 3,221,790 | 12/1965 | Poupitch | 151—7 |

EDWARD C. ALLEN, *Primary Examiner.*